Dec. 17, 1957 C. HILL 2,816,616
VEHICLE WHEEL SUSPENSION
Filed Sept. 11, 1953 9 Sheets-Sheet 1

Dec. 17, 1957 C. HILL 2,816,616
VEHICLE WHEEL SUSPENSION
Filed Sept. 11, 1953 9 Sheets-Sheet 6

United States Patent Office 2,816,616
Patented Dec. 17, 1957

2,816,616

VEHICLE WHEEL SUSPENSION

Claude Hill, Kenilworth, England, assignor to Harry Ferguson Research Limited, Abbotswood, Stow-on-the-Wold, England Application September 11, 1953, Serial No. 379,571

Claims priority, application Great Britain September 13, 1952

21 Claims. (Cl. 180—73)

The present invention relates to vehicle wheel suspensions, and more particularly to independent suspensions for non-steerable traction wheels. Improvements are contemplated in independent rear drive wheel suspensions for automotive vehicles, and affording enhanced riding qualities. It is to be understood, however, that the practice of the invention extends to the independent suspension of wheels on any type of vehicle, whether automotive or not.

It is the general aim of the invention to provide an independent suspension system for vehicle wheels which affords improvement in the performance of the vehicle as regards cushioning on bumps, reduction of side sway or "lean" on curves, reduction of lateral tire scrub occasioned by bumps, low unsprung weight but effective bracing of wheels against acceleration and braking forces, automatic springing compensation for varying static loads on the vehicle, and better steering characteristics. Such multiple improvements are achieved by a relatively simple wheel suspension arrangement which is easily fitted within the space available on automobiles.

More specifically, it is an object of the invention to provide a vehicle wheel suspension which locates the roll center for the vehicle in a vertical position to enhance riding performance by means causing an independently sprung wheel to swing about a center other than the pivot of its own swinging half axle.

Another object is to provide for a self-compensating spring system in an independent wheel suspension, wherein the mechanical advantage of linkage connections to a resilient element is varied with changes in static loading, thereby maintaining a substantially constant periodicity and cushioning quality regardless of the load carried by the vehicle.

A further object of the invention is the provision of independent wheel suspension system which not only fulfills the above objectives, but additionally produces very little positive or outward camber of the wheel, thereby substantially eliminating any tendency of the vehicle to oversteer, that is, to turn itself from a straight line of travel.

Additional objects and advantages will become apparent as the following description proceeds, taken in conjunction with the accompanying drawings, in which:

While the invention has been illustrated and is described in some detail with reference to particular embodiments thereof, there is no intention that it be thus limited to such detail. On the contrary, it is intended here to cover all modifications, alterations, and equivalents falling within the spirit and scope of the invention as defined by the appended claims.

Figure 1:
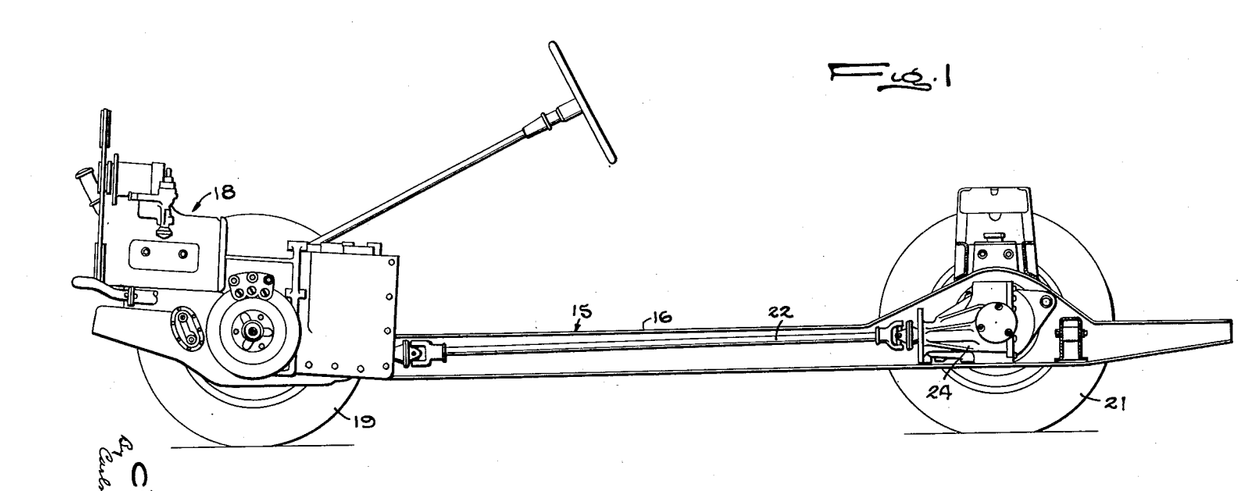
Figure 1 is a longitudinal vertical section of an automobile chassis having its rear wheels suspended from its frame in accordance with a preferred embodiment of the present invention.

Referring now to the exemplary embodiments of the invention here illustrated, a rear suspension system is shown for the rear wheels of an automotive vehicle. To make clear one environment of the invention an automobile chassis is shown (Fig. 1) which includes an elongated frame 15 having a central portion 16 vertically widened at either end for the support of a suitable body (not shown), a prime mover and power transmission means, and the suspension of front and rear wheels. The prime mover appears as an engine 18 mounted at the front over steerable front wheels 19. The latter may be suspended from the frame 15 in any of a variety of ways, for example, by the arrangement described and claimed in applicant's copending application Serial No. 332,793, filed January 23, 1953, now Patent No. 2,775,307. Rear traction wheels 20 and 21 are suspended from the aft end of the frame 15 by the advantageous system to be described. They are powered by a longitudinal drive shaft 22 extending from the engine 18 through the central frame portion 16 to a rear differential 24, which in turn drives transversely extending half axles 25 and 26 connecting at their outer ends to the wheels 20 and 21.

Inasmuch as the suspension components for each rear wheel 20 and 21 are identical, that is, the entire rear suspension is symmetrical about the longitudinal center line of the vehicle, it is deemed sufficient to describe those components suspending one wheel, the same reference characters employed in such description being applied also to the corresponding parts for the opposite wheel.

Figure 2:
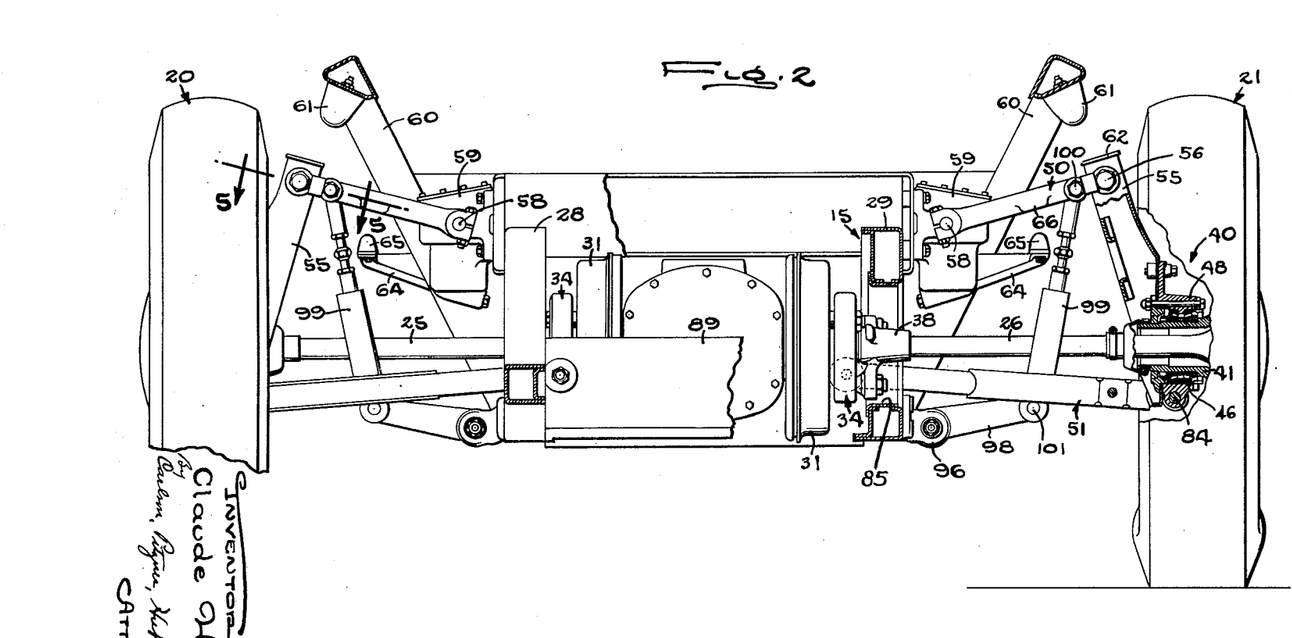
Fig. 2 is a rear elevation, partially in section, of the chassis shown in Fig. 1.
Figure 3:
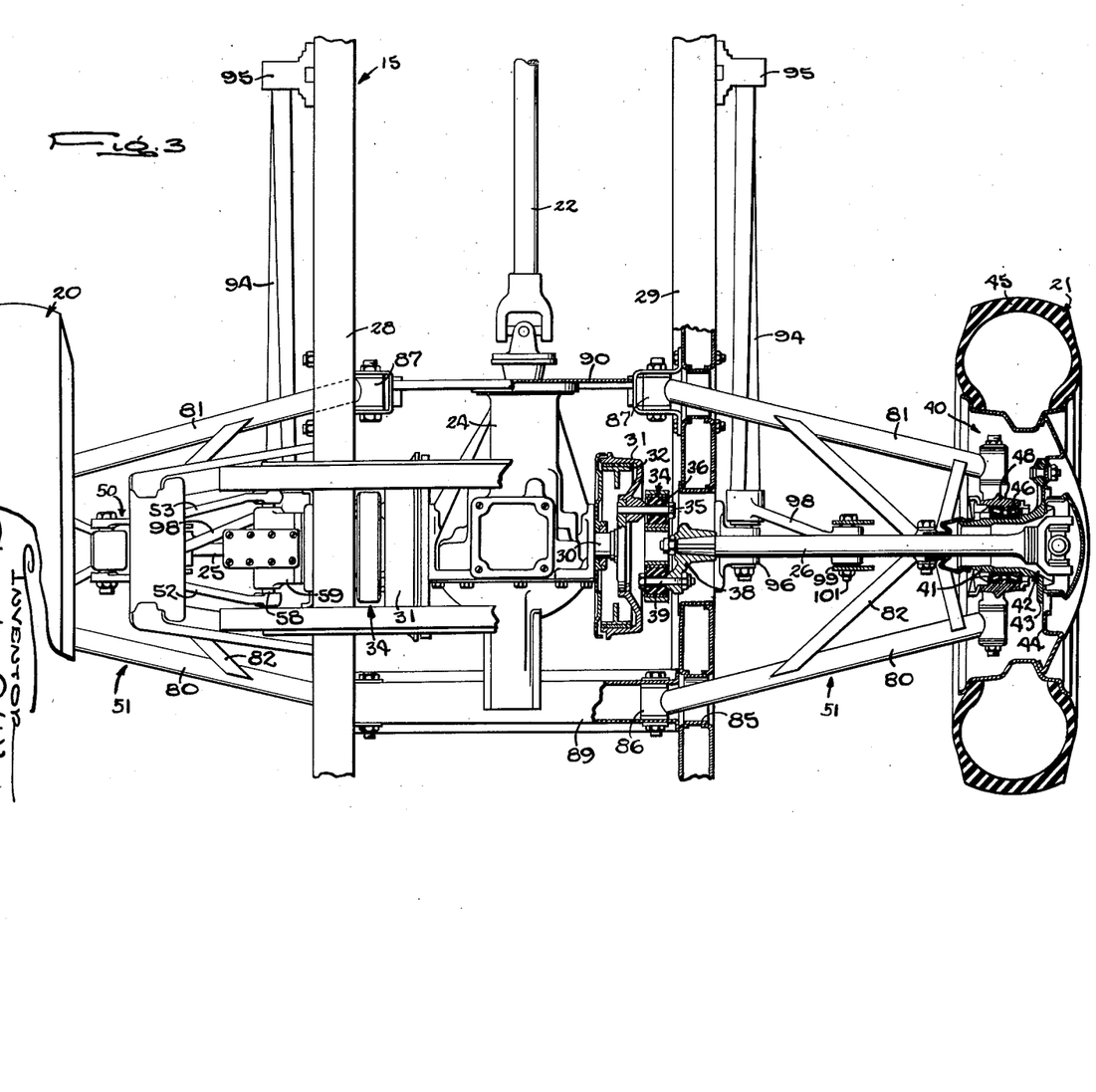
Fig. 3 is a plan view partially in section, of the rear end of the automobile chassis, particularly showing the suspension means.

As shown best in Figs. 2 and 3, the differential 24 is mounted between laterally spaced and interbraced members 28 and 29 of the frame 15. For permitting the axle 26 to swing relative to the frame 15, it is drivingly connected to an output shaft 30 of the differential 24 by universal means. In this instance, the output shaft 30 carries a brake drum 31 adapted to be frictionally engaged at its inner surface by a brake shoe 32, and the drum is in turn connected through a flexible universal coupling 34 to the inner end of the axle 26. The flexible coupling 34 utilizes a plurality of studs 35 extending in circumferentially spaced relation from the brake drum 31 to alternate ones of a series of circularly spaced openings in a deformable, resilient element, preferably a rubber disc 36. A spider 38, rigid with the inner end of the axle 26, carries a plurality of circularly spaced bolts 39 extending through the remaining openings in the rubber disc 36. Such a resilient universal joint may be of the commercial form known under the name "Lay-Rub" in England and described at page 160 of The Automotive Chassis by P. M. Heldt of Nyack, New York, and published by him in 1945. The flexible coupling not only allows universal swinging of the axle 26 but in addition permits slight cushioned endwise movement. It is particularly suitable in that it requires no lubrication or maintenance attention.

Resilient spring means (to be described) are effectively interposed between the axle 26 and the frame 15 to maintain the former substantially horizontal notwithstanding the weight of the vehicle and any load it carries. The axle 26 may swing vertically relative to the frame 15 under the cushioned influence of such resilient means, leaving the frame relatively undisturbed and with the wheel 21 in tractional contact with the ground as the latter encounters bumps or potholes. In accordance with an important aspect of the present invention, provision is made, however, such that wheel 21 swings not about the inner end of the axle 26, i. e., not about the coupling 34 as a center, but about an effective center or pivot point located a finite distance inboard from the axle, preferably on the opposite side of the vehicle's longitudinal center line. This is accomplished by means universally mounting the wheel 21 on the outer end of the axle 26, together with pivoted link means connected between the universal means and the frame to control the canting of the wheel relative to the axle as the latter swings up or down relative to the frame. Such link means also serve as positive bracing against acceleration and braking forces, thereby preventing swing of the axle in a horizontal plane without resorting to separate diagonal struts.

For the universal mounting of the wheel 21, a hub assembly 40 is provided which, in the present instance, includes an annular hub 41 through which the axle 26 extends for connection thereto by means of a Hooke type universal joint 42. For mounting the wheel 21, the hub has a flange 43 to which a disc 44 is bolted. The disc 44 carries an annular rim on which a pneumatic tire 45 is positioned. The cylindrical portion of the hub is journaled by a suitable bearing 46 in a bearing housing 48, the angular canting of the wheel relative to the axle 26 being determined by the controlled positioning of the housing.

The control link means as here embodied includes top and bottom links 50 and 51 pivoted at their outer ends to the housing 48 and at their inner ends to the frame 15. These links are oriented to converge inwardly as shown; that is, the vertical distance between their outer pivots is greater than that between their inner pivots, so that lines connecting the two pivot points of each link converge inwardly toward the vehicle (see Figs. 6 and 9). While a pair of longitudinally spaced bottom and a pair of longitudinally spaced top links may be employed, preferably each link 50, 51 is formed as a unitary component having a pair of longitudinally spaced pivot connections at either end (Fig. 3).

Figures 4, 5:
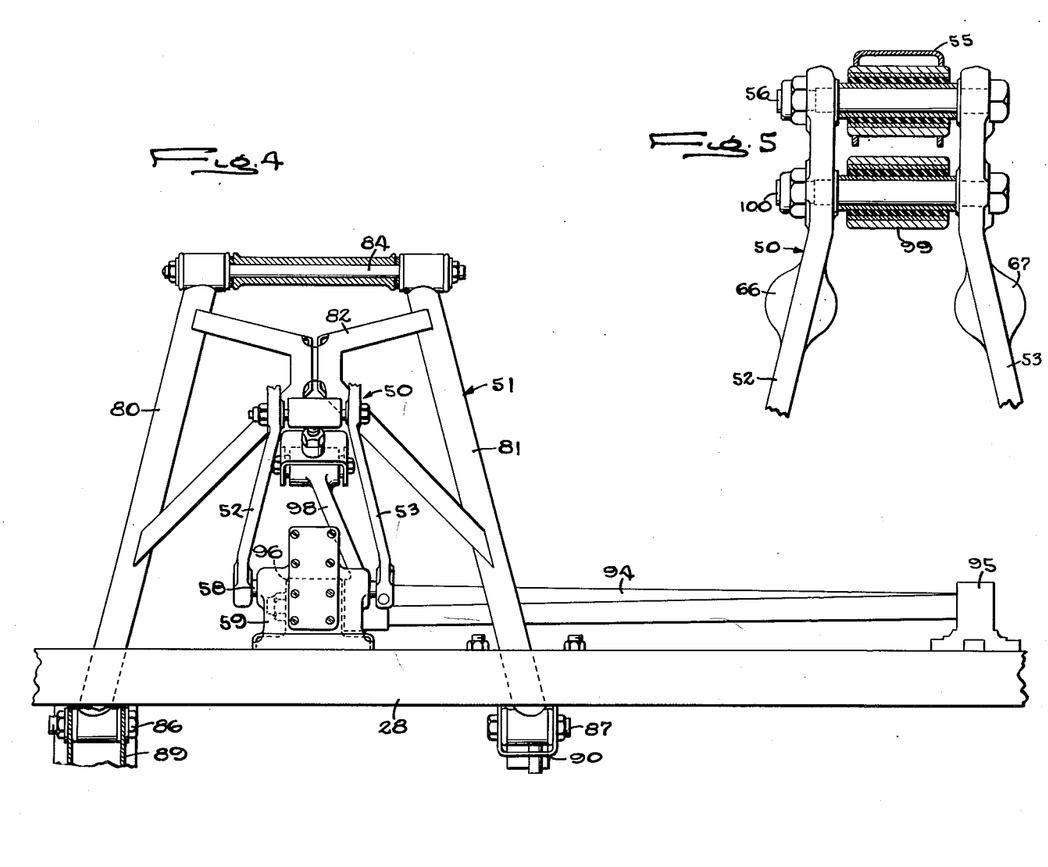
Fig. 4 is an enlarged fragmentary plan view showing details of a part of the wheel suspension.
Fig. 5 is a fragmentary detail view of the upper link pivot connections, partially in section taken substantially along the line 5—5 in Fig. 2.

The top link 50 comprises a pair of arms 52, 53 spaced fore and aft. In order to permit of its relatively short length and to elevate its outer pivot connection, an extension 55 (Fig. 2) is rigidly fastened to the housing 48 to extend upwardly and inwardly. The extension 55 carries a rubber-bushed bolt 56 pivotally receiving the outer ends of the arms 52, 53 (Fig. 5). The inner end of the link 50 may be pivoted to the frame member 29 in any suitable manner.

In the present instance it has been found particularly advantageous to connect the inner ends of the arms 52, 53 to a rotatable actuating shaft 58 for a double-acting hydraulic shock absorber 59 (Fig. 2). The latter may be of conventional construction and suitably bolted to a part of the frame 15. By this arrangement, the inner end of the link 50 is not only effectively pivoted to the frame, but damping means are introduced in the spring suspension system, since the link must swing about its inner pivot as the axle 26 and wheel 21 are deflected relative to the frame. The shortness of the link 50 renders it sufficiently strong to be immune to flexure in serving to actuate the shock absorber; and such shortness gives it a wide swing, for a given swing of the axle 26, to turn the actuating shaft 58 sufficiently for proper action of the shock absorber 59.

Prevention of unduly great swing of the axle 26 and wheel 21 is accomplished in this instance by resilient stop means positioned to be engaged at selected extreme positions of swing. For limiting upward swing, a strut 60 (Fig. 2) is rigidly bolted to the frame 15 to carry a rubber pad 61 which is engaged by a top plate 62 on the extension 55. Downward swing, on the other hand, is limited by a horizontal arm 64 rigid with the shock absorber 59 and having rubber pads 65 located to be engaged by bosses 66, 67 on arms 52, 53.

The bottom link 51 is made longer than the link 50 and spaced more closely to the axle 26, though oriented to converge inwardly toward the latter. It may comprise a pair of arms 80, 81 spaced fore and aft and interconnected by a welded brace 82 (Figs. 3 and 4). Integral sleeves on the outer ends of the arms 80, 81 are pivotally received on opposite ends of a rubber-bushed bolt 84 passed through a mating fore and aft opening in the lower side of the housing 48. The inner ends of the arms 80, 81 are passed through an opening 85 in the frame member 29 for pivot connection on rubber-bushed bolts 86, 87 carried by spaced cross braces 89 and a welded bracket 90, respectively (Fig. 4).

The resilient means effectively interposed between the wheel 21 and the frame 15 in this instance comprises a torsion rod 94 extending longitudinally along the frame member 29 (Fig. 3) to be rigidly fastened at its forward end and axially pivoted at its aft end by brackets 95, 96, respectively. In keeping with another aspect of the invention, linkage means are interposed between the top link 50 and the torsion rod 94 to twist the latter as the axle 26 swings upwardly. Such linkage means are adapted to act with a changing mechanical advantage, so that the spring constant (referred to the wheels) increases with deflection of the wheels. In effect, the linkage means provide for a stiffer springing system as the deflection of the wheel increases in an upward direction even though the torsion constant of the rod 94, of course, remains unchanged.

Such linkage, as here embodied, includes a radius arm 98 fast on the aft portion of the torsion rod 94 and connected by a doubly pivoted link 99 to the outer portion of link 50 (Fig. 2). Preferably the link 99 is adjustable axially in length for obtaining the desired initial angular relationship between the link 50 and arm 98. Its top is pivoted on a rubber-bushed bolt 100 (Fig. 5) carried between the arms 52, 53, while its lower portion is bifurcated to straddle the axle 26 and the outer end of the arm 98 for pivoted connection by a bolt 101. The link 99 is adjusted in length to create an angle greater than ninety degrees between itself and the arm 98 (see Fig. 2) when the vehicle is not loaded and the axle 26 is in its normal horizontal position.

Among the more important advantages obtained in the use of the present suspension are the actions of the converging control links 50, 51 in mitigating pitch, sway, and lateral tire scrub as the vehicle encounters bumps or negotiates curves. Other advantages reside in the cooperative action of the spring means and linkage in providing uniform spring performance over a wide range of static loads.

In explaining the operation and advantages of the suspension described, it might be well to note that in independent wheel suspension systems for vehicles, three problems are injected for any chosen stiffness of the spring means. These problems are (1) lateral displacement of the wheels on vertical swing of the half axles, resulting in sidewise scraping or scrubbing and undue wear of the tires, (2) side sway or roll of the vehicle when rounding curves due to centrifugal forces, and (3) pitch of the vehicle when encountering surface irregularities or bumps. The location of the vehicle roll center, i. e., the center about which the sprung mass of the vehicle oscillates relative to the unsprung mass (when displaced in a transverse plane) largely controls the vehicle riding performance as reflected in each of those three aspects. With a high roll center there is relatively great lateral tire scrub, relatively little sway, and relatively great pitch. On the other hand, with a low roll center (at ground level) as obtained by known parallel link suspensions, there is little or no tire scrub, relatively great sway, and relatively little pitch.

It is the purpose of the present independent suspension to effect a compromise location of the roll center and achieve nominal or compromise amounts of sidewise scrub, side sway, and pitch.

Figure 7:
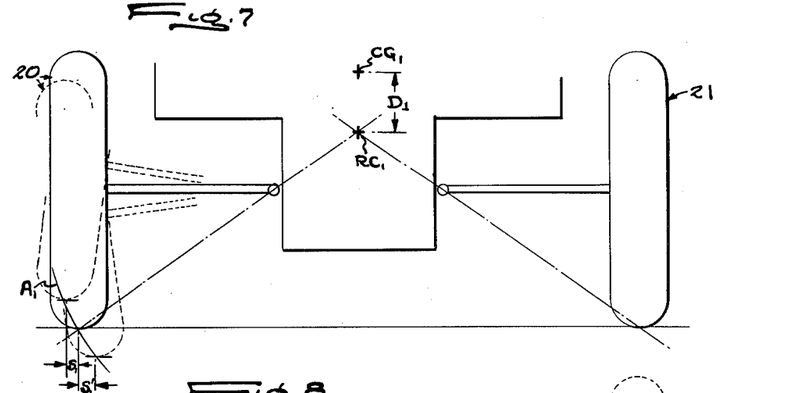
Figs. 7, 8 and 9 are comparative diagrammatic representations of a prior swinging axle suspension arrangement, a prior parallel link suspension arrangement, and the wheel suspension of the present invention, respectively.
Figure 8:
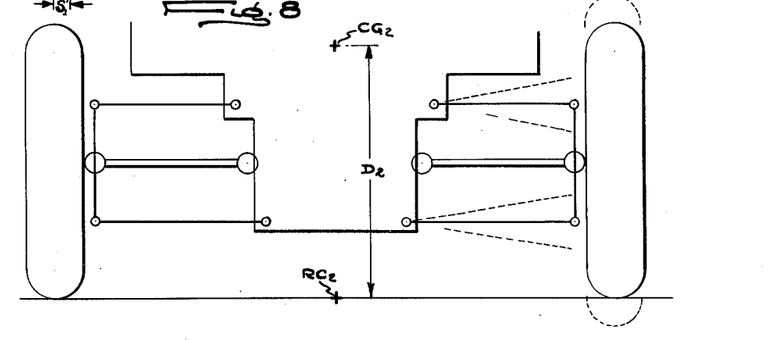
Figure 9:
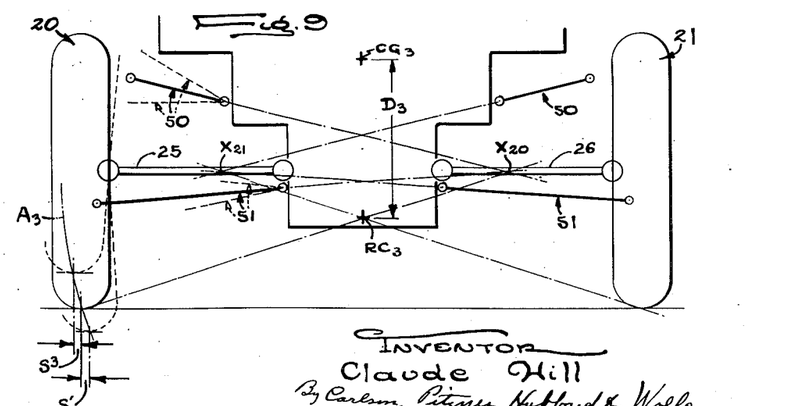

Referring now to diagrammatic Figs. 7 through 9, Fig. 7 illustrates a known form of independent suspension having freely swinging half axles pivoted to a frame at their inner ends. The wheels are connected fast at right angles to the outer ends of the axles, while spring means (not shown) are interposed between the frame and the axles, usually through the intermediary of an axle housing (not shown). In such an arrangement, the wheels must swing with the axles about the inner ends of the latter. The roll center $RC_1$, therefore, is located by the intersection of lines drawn from the points of wheel ground contact through the axle pivot points and falls at a high location above the axles. It will be apparent that as the wheels encounter bumps or depressions in the road or ground, the ground contact points fall along an arc $A_1$ swung about axle pivot points, being scraped sidewise to the extent of the distances $S_1$ and $S_1'$ between upper or lower limits as indicated by dashed lines.

In Fig. 8, a diagrammatic showing of a known parallel link independent suspension appears, top and bottom parallel links being pivotally connected between the frame and wheel hubs carried universally on the axles. As the wheels are vertically displaced on road bumps or depressions and the half axles swing vertically, the links cause the wheels to cant relative to the axles, thereby maintaining their ground contact at substantially the same laterally placed points. Substantially no lateral wheel scrub occurs. Since the ground contact points thus move in a vertical plane only, the roll center $RC_2$ is located on the road surface midway between the wheels (for a more detailed analysis see the Heldt book, supra, at page 551).

The diagrammatic illustration of the present rear convergent link suspension shown by Fig. 9 indicates that as the wheels 20, 21 encounter road bumps or depressions, the links 50, 51 cause the wheels to be displaced slightly laterally to the extent of the dimension $S_3$ and $S_3'$ on up and down swing. That is, the convergent links 50, 51 cant the wheels 20, 21 relative to the axles 25, 26 so that the points of wheel contact with the ground execute arcs of considerable radius around centers having a locus displaced from the pivot point or inner end of the axles. Since the upper and lower links 50, 51 are both pivoted to the wheel hubs, their effect is to cant the wheels relative to the axles and swing them about instantaneous centers $X_{20}$ and $X_{21}$ located by the intersection of the link axes extended. As shown in Fig. 9, the intersection $X_{20}$ (or more properly, the locus of that intersection) for the left wheel 20 links falls considerably inboard of the left axle 25, in fact, between the vehicle's centerline and the wheel on the opposite side thereof, and in this case about midway along the right axle 26. Upon upward swing of the left axle, the left wheel ground contact point describes an arc $A_3$ about the center pivot $X_{20}$ and is laterally displaced only a small amount $S_3$. In a similar manner, downward swing of the axle results in its wheel's ground contact point moving through the arc $A_3$ of large radius about the effective center $X_{20}$, being scraped sidewise only through the distance $S_3'$.

The roll center $RC_3$ is located by the intersection of lines drawn between the ground contact point and the centers $X_{20}$ and $X_{21}$ for the respective wheels. It will be seen, therefore, that in the present arrangement the roll center $RC_3$ is below the axles 25, 26 but above the ground, intermediate the high and low roll centers $RC_1$ and $RC_2$ of freely swinging or parallel link suspensions in Figs. 7 and 8.

While the centers $X_{20}$ and $X_{21}$ shift vertically with different angles of axle swing, i. e., will not remain exactly at the same location, their locus or the range of positions through which they shift is so small as to be negligible in the illustrated linkage. The roll center $RC_3$ will shift slightly as a result, but will not vary appreciably from the mean position indicated.

The asymmetry of the top and bottom links 50, 51 (the former being farther from the axle) gives rise to improvements in the steering performance of the vehicle over bumpy ground. Those skilled in the art are familiar with the phenomena of "understeer" and "oversteer." The former is a tendency of a vehicle to remain in or return to a straight line of travel so that turning pressure must be maintained on the steering wheel while rounding a curve. "Oversteer" is the tendency to deviate from a straight line of travel, or to increase the sharpness of an executed curve. In rounding a turn, the latter effect requires that back pressure be maintained on the steering wheel and makes it relatively difficult to bring the vehicle out of the curve.

Many factors affect understeering or oversteering. Ideally, the vehicle would neither understeer nor oversteer, but since such a balance of factors is substantially impossible to achieve at the present state of the art, understeering is preferred as being safer, although it should not be too pronounced.

One of the factors creating an oversteering tendency is a sidewise slipping of rubber tired wheels when the vehicle is executing a curve. That is, the tires deform and slide sidewise over the ground under centrifugal force acting on the vehicle so that they do not travel exactly in the plane of the wheel. This divergence is commonly termed the "slip angle." It is known that a larger slip angle at the rear wheels than at the front wheels creates an undesirable oversteering effect, lessening the reliability and accuracy of steering. But still further, the slip angle at the rear wheels increases as they incline outward at the top (positive camber) from a position vertical relative to the ground. As a result, extreme positive camber when the wheel rebounds or drops into a pot hole, when the vehicle is designed for heavy loads and then operated without load, or weight on the inner wheel is lessened by centrifugal forces on curves (see for example Fig. 7) results in oversteering or a "mushy" feel at the steering wheel.

The present asymmetric links 50, 51, however, produce some canting of the wheels to achieve the reduced lateral tire scrub and other advantages to be described. Nevertheless, these links act to produce a smaller outward canting (positive camber) than inward canting (negative camber) for the same amount of downward or upward swing of the axle. The oversteering effect as well as tire wear due to "slip" is thus drastically reduced.

Figure 6:
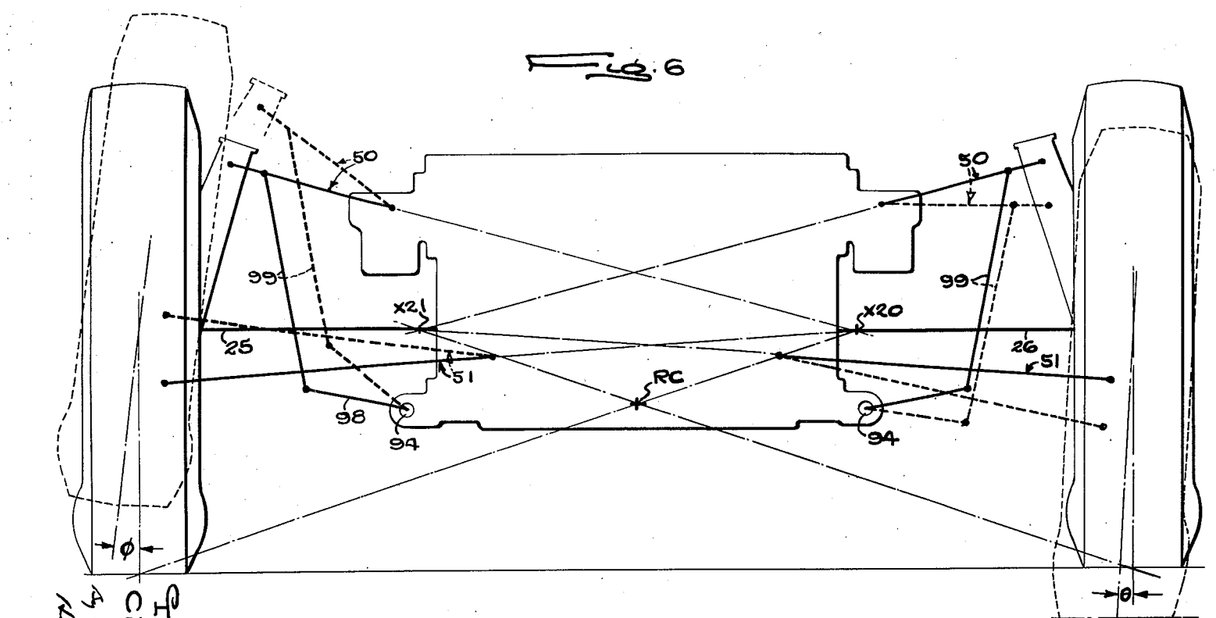
Fig. 6 is a diagrammatic representation of the wheel suspension illustrating by stop-motion views in dashed lines the relative movement of the suspension elements upon bound and rebound of the wheels relative to the vehicle frame.

This action of the present links 50, 51 will be apparent from Fig. 6 where the cant angle $\theta$ (positive camber) on a downward bump is seen to be less than the cant angle $\phi$ (negative camber) on an upward bump. This is due to the fact that the outer end of the top link 50 moves horizontally inward toward the vehicle more for a given angular deflection in an upward direction than it moves outwardly from the vehicle for a given downward angular deflection. The bottom link, being longer and more nearly horizontal in its original position does not have its outer end moved by appreciably different horizontal distances on up or down swing from its normal position. It has been found that by the arrangement shown the negative camber angle $\phi$ on a four-inch bump may be on the order of seven degrees while for a three-inch rebound or depression of the wheel the positive camber $\theta$ may amount to only three and one-half degrees.

Every vehicle with sprung wheels tends to lean outwardly from the center of a curve through which it turns due to the action of centrifugal forces. Such an effect is commonly termed "roll" or "side-sway" and the amount of sway encountered depends not only upon the sharpness of the curve, the speed of the vehicle, and the stiffness of the springs, but also upon the locations of the vehicle's center of gravity and roll center (the latter being the point about which the vehicle frame and body roll relative to the ground and the wheels which are assumed to remain in contact with the ground). It may be demonstrated (see the Heldt book, supra) that the centrifugal force on cornering acts at the center of gravity, thus creating a moment tending to rock the vehicle frame. Such moment is counteracted by a force couple arising from increased loading and deflection of the spring on the outer side of the vehicle and decreased loading and deflection on the spring on the inner side of the vehicle. Opposite swinging of the two axles relative to the frame results, just as if they had been deflected on bumps or pot holes.

Assuming that a given location of the center of gravity, a given contrifugal force, and a given stiffness of springing are the same for a number of vehicles, the sway-creating moment and the resultant sway angle will be proportional to the distance or moment arm between the center of gravity and the roll center for any one vehicle. Therefore, the relatively small distance $D_1$ from the center of gravity $CG_1$ to the high roll center $RC_1$ as located by the free swinging axles in Fig. 7, will result in relatively little sway. However, the relatively great distance $D_2$ between the center of gravity $CG_2$ and the extremely low roll center $RC_2$ occasioned by the parallel link suspension represented in Fig. 8 will result in a great amount of sway, other factors being equal. This will result in an uncomfortable riding effect. Finally, Fig. 9 makes clear that the intermediate distance $D_3$ between the center of gravity $CG_3$ and the roll center $RC_3$ occasioned by the action of the present convergent link improvement is of a compromise value between $D_1$ and $D_2$. Only a moderate amount of sway will result, not seriously objectionable as regards passenger comfort. And, as mentioned before, the resulting positive camber of the inner wheel is relatively small in the present suspension, compared to that experienced with the free swinging axle suspension in Fig. 7, so that little or no oversteering tendency arises.

The same general principle applies in the amount of pitch or rocking imparted to the vehicle when one of the wheels encounters vertical bumps or depressions. Assuming that the weight of the vehicle is concentrated at its center of gravity and that the springing and damping of shock absorbers is uniform, then the frequency of shocked rocking will be inversely proportional to the distance between the center of gravity and the roll center. Other factors being equal, the pitch experienced with the suspension arrangement represented by Fig. 7 and having the short distance $D_1$, would be relatively great and rapid, thus uncomfortable for passengers. Conversely, pitch would be minimized by the arrangement represented in Fig. 8 in view of the relatively great distance $D_2$. An intermediate pitch effect is obtained, however, in the convergent link suspension of the present invention with the roll center at intermediate level providing a compromised length for the moment arm $D_3$.

It will be seen from the foregoing analysis that present convergent link suspension operates to mitigate extremes of lateral tire scrub, sway, and pitch, obtaining a happy compromise capitalizing the advantages and minimizing the disadvantages of prior systems to thereby create an improved overall riding performance.

It is known that the natural frequency of oscillation of an ordinary sprung mass system varies inversely with the static load or deflection of the system, i. e., the frequency decreases (period increases) as the static load increases. In the present spring suspension system, however, the geometry provided is such that the mechanical advantage of the linkage between the wheels, torsion bar, and frame changes as the loading on the vehicle changes, to thereby maintain the system period substantially constant. Stated another way, the linkage provided in accordance with the invention results in the torsion rod being twisted by greater amounts for each equal increment of upward swing of the axle as the total upward swing or deflection of the axle increases. Thus, while the increased weight would otherwise change the system period, the torsion rod becomes stiffer, as referred to the wheel, keeping the period substantially constant and the springing action uniform.

It will be seen from the left side of Fig. 6 that as the axle 25 swings upwardly (as when the vehicle is more heavily loaded) the top link 50 rises, and through increased tension in the actuating link 99 twists the torsion rod 94 until the latter exerts an equal reactive force. Since the distance from the inner end of the link 50 to its connection with the link 99 is greater than the length of radius arm 98, the angle through which the latter must turn is greater than the angle through which the link 50 turns. And by virtue of the link 99 being pivoted at either end, the corresponding angular increment of the arm 98 becomes greater for each equal angular increment of the link 50, as the total angular displacement of the latter increases. In other words, the rate of twist of the torsion rod 94, referred to the link 50 or the axle 26 becomes greater with increasing deflection. While the torsion constant for the rod 94 remains unchanged, the mechanical advantage with which its reactive force acts increases, and referred to the link 50, it becomes "stiffer." As stated before, increased static loading normally changes the behavior and decreases the natural frequency of a spring system. In present suspension, however, increased static loading also "effectively" increases the torsion constant or stiffness of the rod 94, thus maintaining the performance substantially uniform over a wide range of static loads.

The relatively great fore and aft spacing of the inner pivots for both the top and bottom links 50, 51 constitute these as effective braces preventing horizontal swing of the axles due to braking or acceleration forces. The present control link configuration is particularly advantageous when employed in combination with inboard brake means such as the brake drum 31 and shoe 32. The asymmetry in length and spacing from the axle of the top links 50, 51 permits them to withstand great fore and aft forces on the wheel. Upon acceleration, such force is in a forward direction at the point of ground contact, thus tending to rotate the bearing housing 48 and twist the links 50, 51. A greater moment arm acts on the top link 50, but its shorter length renders it more rigid for a given thickness and cross-sectional area to resist deflection or twisting. On the other hand, the moment arm for the longer, lower link 51 is not so great since it is closer to the ground, and it thus withstands the twisting stresses without being inordinately wide in a fore and aft direction for its length. This is of importance because in connecting to the lower side of the bearing housing 48, the top link must clear the surrounding wheel rim.

Upon actuation of the inboard brake means, a rearward reaction force is applied to the hub at axle level. The tendency of the links to be twisted is therefore not so great as in the case of outboard brakes or upon accelerations. In so far as such twisting tendency is present, the top link, being stronger, takes more of the twisting forces, the bottom link being closer to the axle at its outer ends. The bottom link, therefore, need not be inordinately wide in a fore and aft direction though relatively long to produce the desired canting of the wheel relative to the axle, as described.

Figure 10:
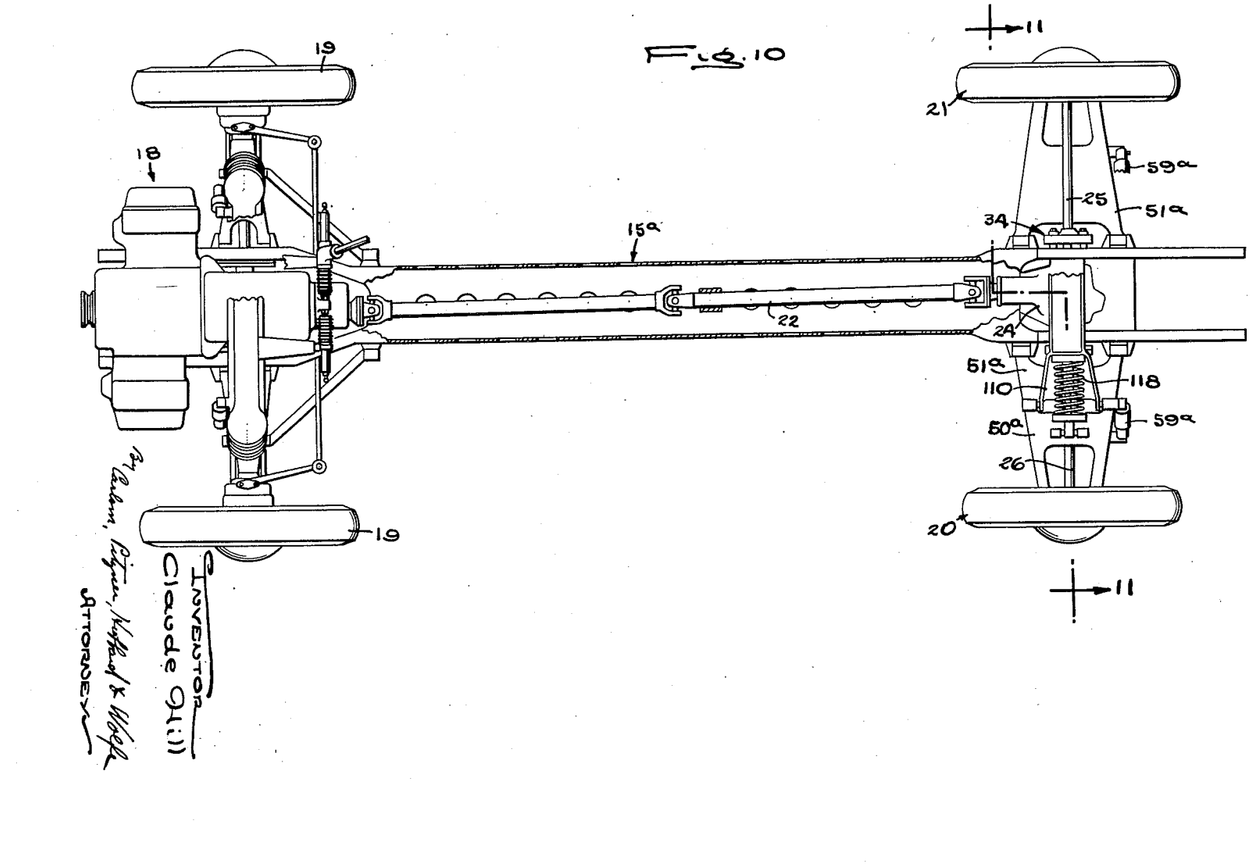
Fig. 10 is a plan view, partially broken away, of an automotive chassis having a rear wheel suspension constructed in accordance with a modified embodiment of the invention.
Figure 11:
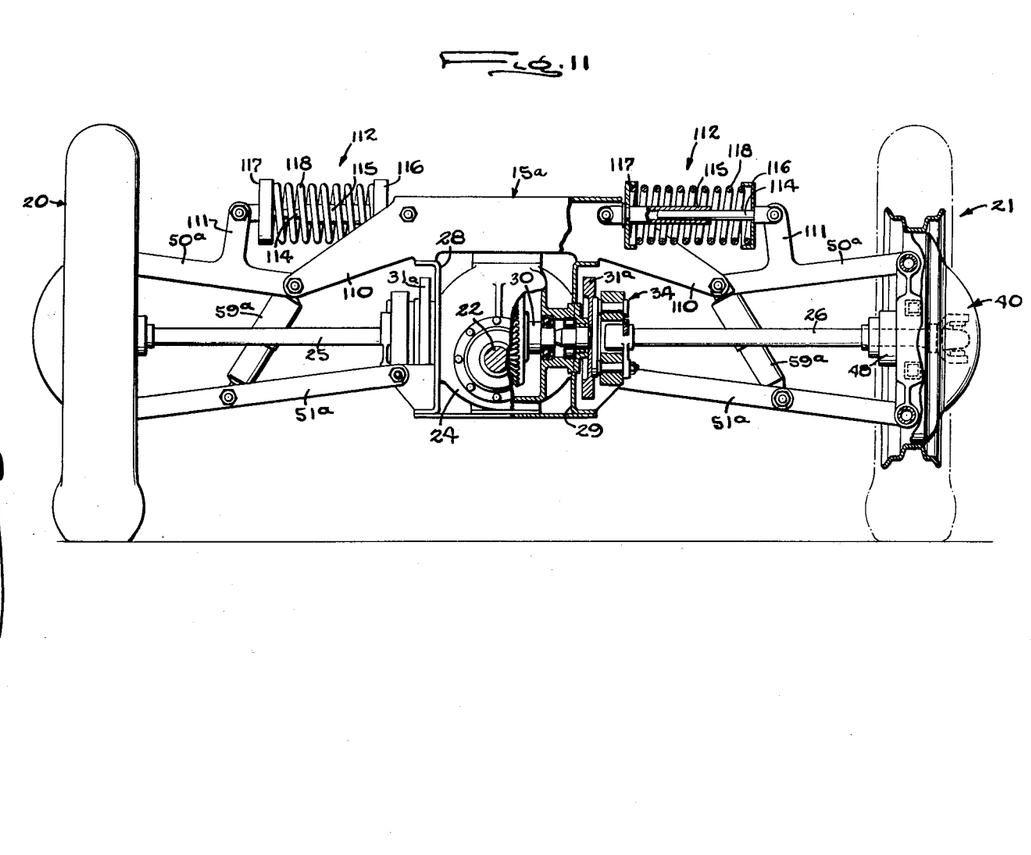
Fig. 11 is a vertical section taken substantially along the offset line 11—11 in Fig. 10.
Figure 12:
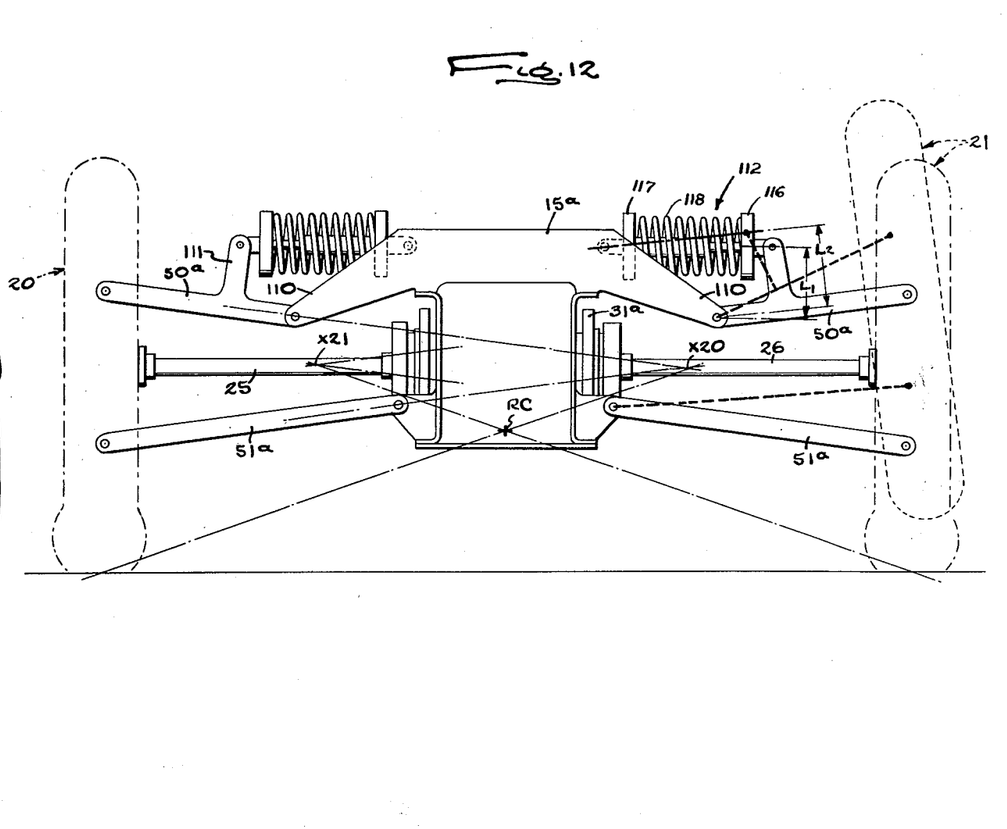
Fig. 12 is a diagrammatic representation of the suspension system in Fig. 11 showing by stop-motion views in dashed lines the relative movement of the several components upon bound and rebound of the wheels relative to the vehicle frame as occasioned by road bumps or depressions.

Turning now to Figs. 10, 11, and 12, a modified embodiment of the invention is there illustrated which is basically similar to that previously described. In so far as corresponding parts appear in the modified embodiment, the same reference numerals are used.

The principal distinctions to be noted are that the output member 30 (Fig. 11) is equipped with a brake disc 31a in lieu of the drum 31 shown in Fig. 3, thus adapting the suspension to have inboard braking by well-known disc-type brakes. The flexible universal coupling 34 is the same as that previously described, while the universal mounting of the wheel 21 on the outer end of the axle 26 by a hub assembly 40 has also been previously described. In this embodiment, however, the frame 15a is formed to have laterally projecting arms 110 which pivotally receive the inner ends of upper control links 50a. Both the upper and lower links 50a, 51a are in this instance formed as relatively flat steel pressings, broad in a fore and aft direction to brace the axles against horizontal swing (Fig. 10). The links have their outer ends connected directly to the bearing housing 48 at points spaced equally above and below the axle 26. The inwardly converging angles which the links make with the axle 26 are equal and the arrangement may thus be termed "symmetrical." For damping the sprung suspension, telescoping type direct-acting shock absorbers 59a may be pivotally connected between medial portions of the lower links 51a and the arms 110 as shown. The swinging of the lower links, therefore, in this instance serves to actuate the shock absorbers.

For cushioning the upward swing of the wheel 21 on bumps and urging it into tractional contact with the ground when it encounters depressions, spring means are interposed between the top link 50a and the frame 15a. In the modified form here illustrated, an upright stub 111 integral with the link 50a pivotally receives one end of a spring carrier assembly 112 which is generally horizontally disposed for pivot connection at its other end to the arm 110. The carrier assembly 112 is axially extensible, and for this purpose includes inner and outer members 114, 115 telescoped one on the other. For effective resilient opposition to telescoping contraction, the members 114, 115 have opposed collars 116, 117 bearing against opposite ends of a coil spring 118. Upward forces on the wheel 21, or downward forces on the frame 15a due to the vehicle's weight and loading, result in an upward swing of the axle 26 and link 50a, thereby compressing the spring 118 to cushion and limit such swing. Because the carrier 112 is pivoted at either end, it too swings upwardly, as well as contracting axially during such compression of the spring 118.

The controlling action of the inwardly converging links 50a and 51a is similar to that previously described in connection with the preferred embodiment represented by Figs. 1-6 and 9. Such controlled canting of the wheels 20, 21 on upward or downward swing is diagrammatically represented in Fig. 12. This figure also indicates that the wheels 20, 21 by virtue of their universal hub assemblies 40 and the converging links 50a, 51a swing about centers $X_{20}$ and $X_{21}$ located finitely inboard from the inner ends of their axles 25 and 26. The locus of the effective swing centers for the two wheels 20 and 21 being thus located by the points $X_{20}$ and $X_{21}$, the roll center RC for the suspension is located, as shown, at the intersection of lines drawn from the point of ground contact for each wheel to its effective swing center. The roll center RC therefore falls above the ground level but below the axles 25, 26 at a vertical location intermediate those obtained by the prior suspensions diagrammatically represented by Figs. 7 and 8. As explained previously, this compromise location of the roll center RC results in compromised degrees of lateral tire scrub, vehicle pitch, and vehicle sway, all being reduced in degree to be unobjectionable with regard to tire wear and the riding comfort of passengers.

The spring assembly 112 and spring 118 are horizontally disposed to conserve space beneath the body (not shown) of the vehicle, yet coupled in such a manner as to give a substantially uniform springing period and performance under varying static loads. Referring again to Fig. 12, as the wheel 21 swings upward with respect to the frame 15a, the spring 118 is compressed to push outwardly, against the collar 116 and thus against the stub 111 to limit and cushion such swing. Owing to the fact that the carrier assembly 112 is pivoted at either end, the reactive force of the spring 118 can only be exerted along its axis. Further, the carrier assembly 112 itself also swings upwardly about its inner end. Considering moments about the inner end of link 50a, it will be apparent that the reactive moment produced by a given spring force is proportional to the distance from the inner end of the link 50a to the axis of assembly 112, measured perpendicularly to such axis. This distance increases with increased upward deflection of the wheel 21. In the normal wheel position, the moment arm is indicated as $L_1$, while it increases to the value $L_2$ when the wheel 21 is deflected upward. The reactive moment on the link 50a is therefore increased disproportionately with increasing upward wheel deflection, by virtue of the increasing mechanical advantage of the spring connection.

Viewed in another sense, the horizontal movement of stub 111 becomes greater for each angular increment of swing for the link 50a as it is deflected. This will be apparent upon considering that if the link 50a were vertical, slight angular movement about its inner pivot would result in substantially purely horizontal movement of the stub 111. Compressed deflection of the spring 118 therefore becomes greater for each angular increment of the link 50a as its total upward swing increases. As a result the spring 118 becomes "stiffer" as referred to the wheel 21, though, of course, the spring constant for the spring 118 alone remains unchanged. This action compensates for the usual reduction in natural frequency of a spring system as the static load increases. By proper dimensioning of the several components, the natural frequency or period of the suspension may be maintained substantially constant when the vehicle is either empty or heavily loaded with passengers and baggage.

I claim as my invention:

1. A vehicle wheel suspension assembly comprising, in combination, a half axle pivotally connected at its inner end to the vehicle frame, a wheel universally connected to the other end of said axle to be driven thereby, means including a housing journaling said wheel, a pair of links pivotally connected to said housing above and below said axle and extending inwardly for pivoted connection to the vehicle, lines between the pivots of the respective links converging inwardly toward the vehicle to intersect at a locus of points which is disposed between the center line of the vehicle and the opposite wheel to thereby effect swing of said wheel about such locus of points, spring means for cushioning such swing as the wheel encounters bumps, and a linkage connected between one of said links and said spring means, said linkage including means producing a mechanical advantage for the spring means varying directly with deflection of said axle relative to said vehicle.

2. In a wheel suspension assembly for mounting ground wheels on a vehicle frame, the combination comprising a half axle extending laterally of said frame and connected to swing in a vertical plane relative thereto, means universally connecting said wheel to the outer end of said axle, a housing journaling said wheel, a pair of vertically spaced links pivoted at their one ends to said housing and at their other ends to said frame, the vertical separation of the pivots on said housing being greater than on said frame to orient lines connecting the pivots for each of said links in inwardly converging relation such that they intersect at a locus of points which is located between the center line of the vehicle and the opposite road wheel, a resilient spring member connected at one end thereof to said frame, and means connecting one of said links to the other end of said spring member to oppose upward deflection of said wheel relative to said frame, said connecting means including means for increasing the mechanical advantage for the spring member as said upward deflection increases under increased static load on said frame, whereby the periodicity of the suspension is maintained substantially constant.

3. In a suspension assembly for connecting a ground wheel to a vehicle frame, a half axle extending transversely of said frame and connected at its inner end to swing relative to the frame, means universally mounting the wheel on the outer end of said axle, top and bottom links pivotally connected at their outer ends to said mounting means and at their inner ends to the frame, said top link being shorter than said bottom link and spaced a greater distance above said axle than said bottom link is spaced below said axle, said links being oriented such that lines connecting the pivot points of each link converge inwardly toward one another to intersect at a locus spaced between the center line of the vehicle and the opposite ground wheel, a torsion rod fast at one end of said frame, a radius arm fast on the other end of said torsion rod, an actuating link pivotally connected beween said radius arm and one of said links to twist the torsion rod upon vertical deflection of said wheel, said radius arm being shorter in length than the distance between the inner end of said one link and the point at which said actuating link is connected thereto so that the mechanical advantage for the torsion rod increases as the upward deflection of said wheel relative to the vehicle increases.

4. In a suspension assembly for connecting a ground wheel to a vehicle frame the combination of a half axle adapted to rock about its inner end relative to the frame, means universally mounting the wheel on the outer end of said axle, top and bottom links pivoted at their opposite ends to the wheel and the frame at vertical distances greater and lesser above and below said axle, respectively, said top and bottom links being connected such that lines connecting the pivot points of each link converge toward one another in an inward direction toward the frame to provide a locus for the effective rocking center of the wheel relative to the frame which is located inboard of said axle and between the center line of the vehicle and the opposite ground wheel as the latter swings vertically relative to the frame, a torsion rod fixed at one end to said frame, and means connecting the opposite end of said rod to be twisted by said top link upon vertical swing of the latter, upward swing of said axle being thereby resiliently cushioned by said rod, and brake means operative on the inner end of said axle to leave said top and bottom links substantially free of twisting stresses on braking of the wheel.

5. In an assembly for suspending a traction wheel from a vehicle frame, the combination comprising a live half axle, means universally connecting the inner end of said axle to a driving member on the frame, means including a hub and housing universally mounting the wheel on the outer end of said axle, a first link pivoted at one end to said housing beneath said axle and converging inwardly at a first angle toward the latter for pivot connection at its other end to the frame, a second link pivoted at one end to said housing above said axle and converging inwardly at a second angle greater than said first angle toward the axle for connection at its other end to the frame, said first and second links thereby converging inwardly toward one another such that lines connecting the pivots of each intersect at a locus of points spaced between the frame's longitudinal center line and the opposite road wheel, a rotary shock absorber on said frame pivotally receiving the inner end of said second link and actuated thereby, a torsion rod extending longitudinally along said frame and rigid at one end with the latter, a transverse radius arm connected to the opposite end of said torsion rod, and an actuating link pivoted between said second link and said radius arm to twist said torsion rod upon rocking of said link, said radius arm being shorter from its connection to the torsion rod to its connection with said actuating link than the distance between the said one end of said second link and the point at which the actuating link is connected thereto, whereby the rate of twist for said torsion rod referred to said half axle increases as the latter is deflected upwardly relative to said frame to thereby maintain the springing action of said torsion rod substantially constant under varying static loads on said frame.

6. In a four wheel vehicle, a wheel suspension assembly for mounting a ground wheel on a vehicle frame and comprising, in combination, means supporting said wheel for vertical swing relative to the frame including upper and lower links pivoted between the wheel and the frame along lines converging toward the latter to intersect at a locus lying between the vehicle center line and the wheel on the opposite side of the vehicle, a coil compression spring, a telescoping carrier for said spring pivoted at its one end to the frame and at its other end to said upper link, upward swing of said upper link thereby compressing said spring to cushion the deflection of said wheel on bumps, the pivot locations of said carrier being chosen so as to increase the mechanical advantage of the spring as the static load on the frame increases.

7. In a four wheel vehicle, a wheel suspension for mounting a live half axle on a frame and comprising the combination of controlled swing means including drive means for pivoting the axle at its inner end for vertical swing relative to the frame, a hub assembly universally mounted on the outer end of said axle and carrying a wheel, and upper and lower control links pivoted between said hub assembly and the frame with relative orientation such that lines connecting the pivot points at opposite ends of said links converge inwardly to intersect at a locus lying between the vehicle center line and the wheel on the opposite side of the vehicle; with a compensated spring arrangement including spring means pivotally connected at its one end to the frame inboard of the upper link pivot connection to the frame and at its other end to a point on said upper link, said spring means being compressed upon upward swing of said upper link but pivoting about its one end to maintain the suspension period substantially constant under varying conditions of static loading.

8. In a wheel suspension mechanism for a pair of vehicle ground wheels, the combination with a separate pair of mounting links for each of said wheels and adapted to project laterally at respective sides of the vehicle, of means for pivoting the opposite ends of each link in a pair for up and down swing of the same with lines connecting the pivots of the links in a pair converging inwardly at angles such that the lines intersect at a locus of points between the center line of the vehicle and the wheel on the opposite side of the vehicle from such pair of links.

9. In a wheel suspension mechanism for a pair of vehicle ground wheels, the combination comprising a separate pair of mounting links for each wheel projecting laterally from respective sides of the vehicle frame, housings rotatably receiving said wheels, means for pivoting the outer ends of each pair of links to the respective wheel housing at points spaced a predetermined vertical distance apart, means for pivoting the opposite ends of said links to the frame at points spaced vertically less than said predetermined distance, lines connecting the pivots of each link in a pair thereby converging inwardly from their respective wheels at angles such that they intersect at a locus of points lying between the opposite wheel and the center of the vehicle.

10. In a vehicle having a frame and a ground wheel, a suspension arrangement comprising, in combination, a half axle pivoted at its inner end for vertical swing relative to the frame, a hub assembly universally mounted at the outer end of said axle and adapted to carry the wheel for drive by said axle, a pair of vertically spaced control links pivoted between said hub assembly and the frame such that lines connecting the pivot points of each link converge in a direction from the outer to the inner end of said axle to intersect at a locus of points lying between the longitudinal center line of the vehicle and the opposite ground wheel, whereby said hub assembly is canted by said links relative to said axle upon swing of the latter to thereby cause the effective swing of said wheel to be about instantaneous centers having a locus spaced inwardly from the inner end of said axle and defined by the intersection of said lines.

11. In a vehicle having a driven rear half axle for carrying a rear traction wheel, the combination comprising means mounting said axle for vertical swing relative to said vehicle, a hub universally and drivingly connected to the outer end of said axle, means securing the wheel to said hub, a bearing housing journaling said hub, upper and lower links pivotally connected at their respective ends to the vehicle and said housing such that lines connecting the pivot points of each link converge in a direction from said housing toward the vehicle and intersect at a locus of points lying between the center line of the vehicle and the opposite road wheel, said links controlling the vertical tilting of said hub to swing the wheel about said locus of points upon vertical swing of the latter relative to the vehicle, to thereby reduce lateral wheel scrub and locate the vehicle roll center above ground level but below said axle and an inboard brake operative on the inner end of said axle to eliminate twisting stress in said links upon braking of the wheel.

12. In an automotive vehicle, a rear wheel independent suspension assembly comprising, in combination, a live half axle adapted to be driven from an engine; means pivotally connecting said axle at its inner end to the vehicle for relative vertical swing; a hub assembly including a hub member, universal means pivotally connecting said hub member to be driven by the outer end of said axle, and a bearing housing journaling said hub member; a road wheel carried by said hub member; control means including a pair of links located respectively above and below said axle, means pivotally connecting said links between said vehicle and said bearing housing with the vertical distance between the link pivot locations on the vehicle being less than the vertical distance between the link pivot locations on said bearing housing, lines connecting the pivots of each of said links converging toward their inner ends and intersecting at a locus lying between the center line of the vehicle and the rear wheel on the opposite side of the vehicle, and means including said links for restraining said axle against the fore and aft swing relative to said vehicle, the suspension roll center being thus located at a point below the axle but above ground level.

13. Means for suspending a traction ground wheel from a vehicle frame comprising, in combination, a live half axle extending transversely from said frame, a flexible coupling at the inner end of said axle adapting the latter to swing relative to said frame, a hub universally jointed to the outer end of said axle and adapted to carry the wheel, a bearing housing journaling said hub, top and bottom links pivoted at their one ends to vertically spaced points on said housing and at their other ends to points on said frame spaced vertically less than said housing pivot points, lines connecting the pivots of each of said links converging inwardly to intersect at a locus which lies between the center line of the vehicle and the ground wheel on the opposite side thereof, the wheel thereby swinging about such intersection of lines when deflected by bumps to locate the vehicle roll center above the ground level but below said axle.

14. In a suspension assembly for mounting a ground wheel on a vehicle frame, the combination comprising a half axle universally connected at its inner end to said frame, means universally mounting the wheel on the outer end of said axle, a top link above said axle and pivoted between said mounting means and said frame, a bottom link below said axle and pivoted between said mounting means and said frame, said top and bottom links being disposed such that lines connecting the pivot points of each link lie in inwardly converging relation to said axle and intersect at a locus lying between the center line of the vehicle and the wheel on the opposite side thereof, said top link being shorter than said bottom link and converging toward said axle at a greater angle to thereby effect swing of said wheel about an instantaneous center on said locus, the outward inclination of said wheel thereby being less than the inward inclination of said wheel as said axle swings equally down or up, respectively, and an inboard brake effectively operative on the inner end of said axle to thus obviate twisting stress in said links upon braking of the wheel.

15. In a suspension assembly for mounting a ground wheel on a vehicle frame, the combination comprising a live half axle universally connected at its inner end to a driving member on said frame, means including a universal joint, a hub, and a bearing housing journaling said hub for universally mounting said wheel on the outer end of said axle, a rigid upward extension of said housing, a top link pivoted between said extension and said frame to converge inwardly with respect to said axle, a bottom link pivoted between said housing and said frame to converge inwardly with respect to said axle, said links being oriented such that lines connecting their pivots converge inwardly and intersect at a locus lying between the longitudinal center line of the frame and the wheel on the opposite side thereof, the vertical spacing between said axle and said top link being greater than between said axle and said bottom link and the convergence of the top link greater than the convergence of the bottom link to thereby produce greater negative camber than positive camber of said wheel upon equal degrees of up and down swing of said axle.

16. In a suspension assembly for mounting a ground wheel on a vehicle frame, the combination comprising a half axle universally and drivingly connected at its inner end to said frame, a hub assembly universally mounting the wheel on the outer end of said axle, a pair of control links spaced respectively above and below said axle, means pivotally connecting the outer ends of said links to said hub assembly with the vertical distance between said axle and the upper link being greater than that between said axle and the lower link, the upper link being shorter in length than the lower link, means pivoting the inner end of the lower link to said frame and orienting a line connecting the pivots of the lower link to converge inwardly toward said axle, and means including a shock absorber mounted on said frame and having a rotatable actuating shaft receiving the inner end of the upper link, the latter being thereby pivoted to said frame, a line connecting the pivot points of said upper link being oriented to converge inwardly toward said axle, said upper and lower links being disposed so that said two lines intersect at a locus lying between the center line of the vehicle and the wheel on the opposite side thereof.

17. In a four wheel automatic vehicle, a wheel suspension assembly comprising an axle extending transversely of the vehicle pivoted at its inner end for vertical swing relative to the vehicle frame, a hub pivoted to the outer end of said axle and adapted to journal one of the vehicle wheels, a pair of vertically spaced links pivoted at their opposite ends to the vehicle frame and the hub, said links being disposed such that lines joining the pivot points at their opposite ends converge inwardly to intersect at a locus lying between the vehicle center line and the wheel on the opposite side of the vehicle, a compression spring, means pivotally mounting said spring between a medial point on one of said links and a point on the frame inboard of the pivot connection of said one link to the frame so as to resist upward swing of the axle relative to the frame.

18. In a four wheel automotive vehicle, the combination comprising a live axle pivotally connected at its inner end to a frame for relative vertical swing, a hub pivoted to the outer end of said axle and adapted to journal one of the vehicle wheels, a pair of vertically spaced links pivoted at their opposite ends to the vehicle frame and the hub, said links being disposed such that lines joining the pivot points at their opposite ends converge inwardly to intersect at a locus lying between the vehicle center line and the wheel on the opposite side of the vehicle, a spring pivoted at its one end to the frame inboard of the inner end of one of said links and at its other end to said one link to thereby be compressed upon upward swing of the axle, said spring thereby pivoting to increase the perpendicular distance between its axis and the inner end of said link upon increased spring deflection, and thereby maintaining substantially constant periodicity under varying conditions of static loading.

19. In a four wheel automotive vehicle having a frame, a wheel suspension assembly comprising an axle pivotally connected at its inner end to the frame for relative vertical swing, a hub pivoted to the outer end of said axle and adapted to journal one of the vehicle wheels, a pair of vertically spaced links pivoted at their opposite ends to the vehicle frame and the hub, said links being disposed such that lines joining the pivot points at their opposite ends converge inwardly to intersect at a locus lying between the vehicle center line and the wheel on the opposite side of the vehicle, a spring, and telescoping carrier means pivotally mounting said spring between a medial point on said link and a point on the frame inboard of the inner end of said link for deflection upon swing of said link, said carrier means being swung about its pivot connections as an incident to swing of said link to change the perpendicular distance from the axis of said spring to the inner end of said link.

20. In a suspension assembly for mounting a ground wheel on a vehicle frame and having a half axle vertically swingable relative to the frame together with a control link pivotally connected between the frame and a part movable with the outer end of said axle, compensated spring means comprising, in combination, a torsion member fast at one end with the frame, a radius arm fast on the opposite end of said torsion member, means including an actuating link pivoted at one end to said radius arm and at the other end to said control link to twist said torsion member upon upward swing of the axle, said actuating link being connected to said control link at a distance from the pivot connection of the latter to said frame which is greater than the length of said radius arm to cause an increase in the rate of twist of said torsion member as referred to the axle as the total upward deflection of the latter is increased, the springing action of the suspension thereby remaining substantially uniform with varying static loads on said frame.

21. In a wheel suspension system for a vehicle frame wherein a half axle is pivoted at its inner end to swing vertically relative to the frame, spring means for the suspension comprising, in combination, a control link pivoted to the frame and connected to swing in sympathy with said axle, a torsion rod extending longitudinally of the frame and fast at one end therewith, a radius arm on the opposite end of said torsion rod, an actuating link pivoted between said control link and said radius arm to thereby twist said torsion rod as the axle swings relative to the frame, said radius arm being shorter in length than the distance from the frame pivot of said control link to its actuating link pivot connection, whereby said torsion rod is twisted through progressively greater angular increments for equal angular increments of said control link as the total angular swing of said control link increases, and the period of said spring means remains substantially constant under varying static loads on said vehicle.

References Cited in the file of this patent

UNITED STATES PATENTS

| | | |
|---|---|---|
| 2,157,773 | Probst | May 9, 1939 |
| 2,245,809 | Olley | June 17, 1941 |
| 2,631,681 | Utz et al. | Mar. 17, 1953 |

FOREIGN PATENTS

| | | |
|---|---|---|
| 646,713 | France | July 17, 1928 |
| 689,947 | France | June 3, 1930 |
| 692,948 | Germany | June 29, 1940 |
| 455,908 | Great Britain | Oct. 29, 1936 |